UNITED STATES PATENT OFFICE.

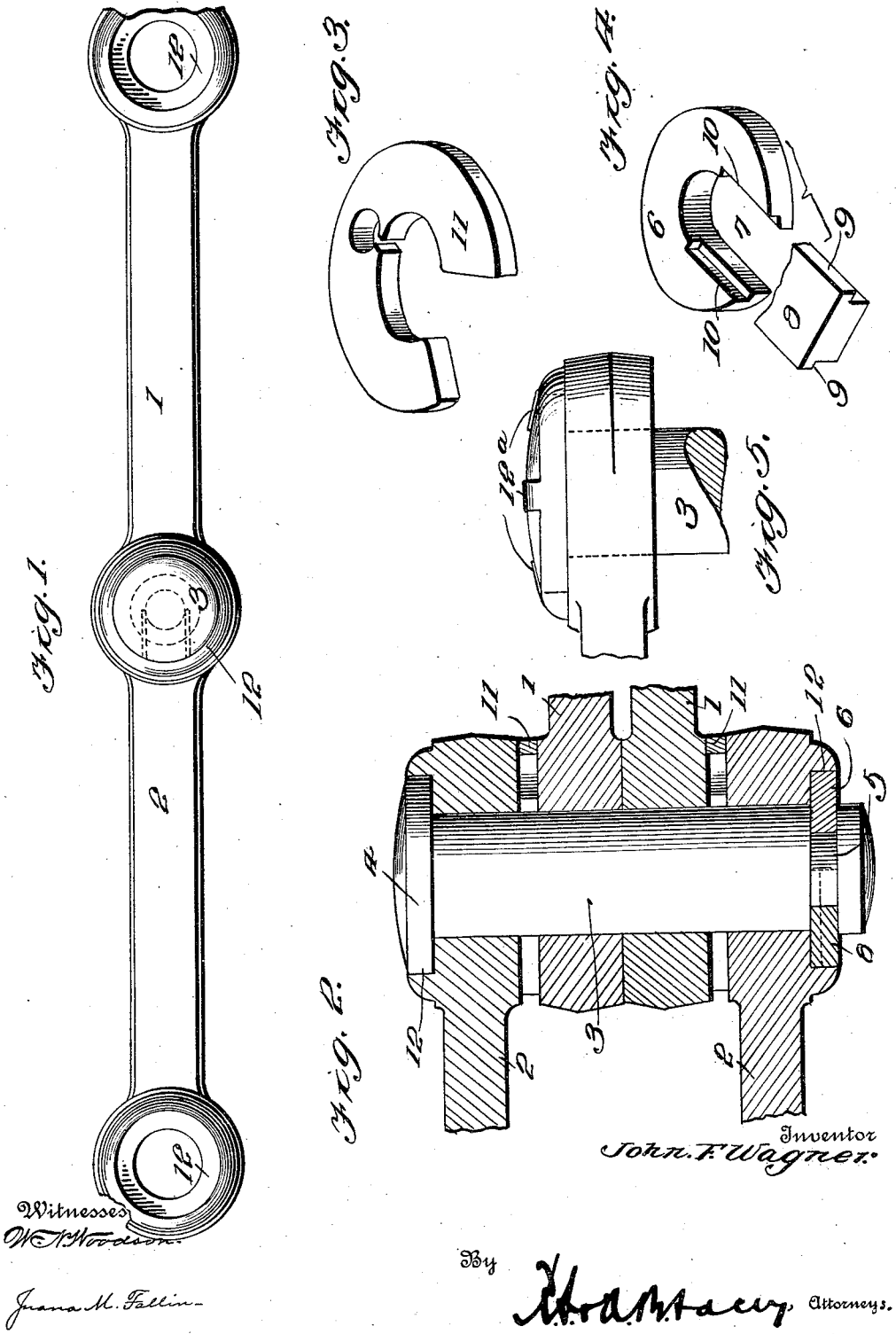
J. F. WAGNER.
DRIVE CHAIN.
APPLICATION FILED MAR. 13, 1911.
1,046,124.
Patented Dec. 3, 1912.

JOHN F. WAGNER, OF TAMAQUA, PENNSYLVANIA.

DRIVE-CHAIN.

1,046,124. Specification of Letters Patent. Patented Dec. 3, 1912.

Application filed March 13, 1911. Serial No. 614,139.

*To all whom it may concern:*

Be it known that I, JOHN F. WAGNER, citizen of the United States, residing at Tamaqua, in the county of Schuylkill and State of Pennsylvania, have invented certain new and useful Improvements in Drive-Chains, of which the following is a specification.

This invention comprehends certain new and useful improvements in drive chains for transmitting motion from one part to another, or for use in elevators, conveyers, car hauls, or the like, and the invention has for its primary object a simple, durable and efficient construction of rivetless chain, the parts of which may be easily manufactured and readily assembled and disassembled when required, while at the same time the completed structure will be strong and positively preclude any liability of the links accidentally coming apart. And, the invention also aims to simplify and otherwise generally improve this class of devices and render them more useful and commercially desirable.

With these and other objects in view, as will more fully appear as the description proceeds, the invention consists essentially in certain constructions, arrangements and combinations of the parts that I shall hereinafter more fully describe and claim.

For a full understanding of the invention reference is to be had to the following description and accompanying drawing, in which:—

Figure 1 is a side edge-view of a portion of a chain constructed in accordance with my invention. Fig. 2 is a sectional view, the pin being shown in elevation. Fig. 3 is a detail perspective view of one of the spacing washers employed. Fig. 4 is a similar view of a locking washer, and Fig. 5 is a detail view of a modification hereinafter specifically described.

Corresponding and like parts are referred to in the following description and indicated in all the views of the accompanying drawing by the same reference characters.

My improved rivetless chain may embody any desired number of links, preferably arranged in pairs, the ends of one pair of links, which I shall hereinafter call the inner links, fitting between the adjoining ends of the next adjacent pair of links which I shall hereinafter call the outer links.

In carrying out my invention and in assembling a chain constructed in accordance therewith, I take two inside links 1 and place them between the corresponding ends of the outside links 2, and insert through the laterally alined ends, a pin, designated 3. The pin 3 is formed at one end with a head 4, and is formed near its opposite end with a preferably annular groove 5. In this latter, a locking washer 6 is designed to fit, said washer being formed with a segmental slot 7, equal in width to the diameter of the grooved portion of the pin 3, whereby the grooved portion of the pin may fit within the central aperture of the washer. After the washer has been applied to the pin, this slot 7 is closed by a fillet 8 which is formed with ribs 9 adapted to fit in recesses 10 which define the opposite side walls of the slot 7 on one face of the washer. After the pin 3 has been inserted in position, and the locking washer 6 applied thereto, one of the outside links 2 is moved outwardly in a lateral direction, and a split spring steel spacing washer 11 is slipped over the pin 3 between the adjoining surfaces of said end, and the adjacent end of the next inside link 1. The other outside link 2 is then moved outwardly in a similar manner, and another steel spring spacing washer 11 inserted between the same and the adjoining end of the other inside link.

It is to be particularly noted that each of the ends of the outside links 2 is formed with an outwardly facing hollow boss 12 of a diameter to accommodate the head 4 and locking washer 6, respectively, so that when the outside links 2 are moved outwardly in a lateral direction for the interposition of the spacing washers 11, the hollow bosses 12 will move over and will encircle and house the head 4 and washer 6, so as to positively preclude the accidental detachment of the washer 6 and the disconnection of the links.

It will thus be seen that I have provided a very simple construction of chain, the parts of which may be easily manufactured and assembled without the use of rivets.

It is to be understood that my invention is not limited to the precise construction, arrangements and proportions of the parts hereinbefore described and illustrated in the accompanying drawing, but that various changes may be made without departing from the scope of the invention as defined in the appended claims.

If desired, the bosses may be formed with lugs 12ª extending therefrom, as indicated in Fig. 5, so as to receive the head 4 or the washer 6, the lugs being subsequently bent over the head or the washer in order to prevent it from slipping out.

Having thus described the invention what is claimed as new is:—

1. In a chain, outside links, the ends of which are formed with laterally disposed outwardly facing bosses, an inner link, the end of which is interposed between the outside links, a pin adapted to be inserted through the ends of the links and provided at one end with a head designed for accommodation in one boss, a locking washer engaging said pin and adapted for accommodation in the other boss, and spaced washers interposed between said ends and adapted to hold the outside links at the outer limit of a lateral movement with the boss engaging with the head of the pin and its locking washer, respectively.

2. In a chain, outside links, an inner link interposed between the outside links, the adjoining ends of the outside links being formed with outwardly facing bosses, a pin inserted through the overlapped ends of the links and provided at one end with a head designed for accommodation in one boss, a locking washer adapted to be secured to the projecting opposite end of the pin and arranged for accommodation in the other boss upon the outward movement of the outside links in a lateral direction, and means between the overlapped ends of the links arranged to hold the outside links at the outer limit of their lateral movement.

3. In a chain, a pair of outside links, a pair of inside links having their ends interposed between the adjoining ends of the outside links, the latter ends being formed with outwardly facing bosses, a pin inserted through the overlapped ends of the links and provided at one end with a head designed for accommodation in one boss and provided near its other end with a groove, a locking washer adapted for attachment to the pin in said groove and arranged for accommodation in the other boss, and spacing washers interposed between the ends of the outside links and the adjoining ends of the inside links, whereby to hold the outside links with their bosses engaging the head and washer of the pin.

4. In a chain, outside links, inside links, the ends of which are interposed between the adjoining ends of the outside links, a pin inserted through the overlapped ends of the links and provided at one end with a head and formed in the other end with an annular groove, a locking washer formed with a segmental edge-opening slot by which it is adapted to be slipped over the pin and into the groove, the washer having the sidewalls of said slot defined by recesses, a fillet adapted to close said slot and formed with ribs fitting into said recesses, and spacing washers adapted to hold the outside links with their ends at the outer limit of a lateral movement, said ends in such position having locking engagement with the head and locking washer of the pin.

In testimony whereof, I affix my signature in presence of two witnesses.

JOHN F. WAGNER. [L. S.]

Witnesses:
  JOHN H. ICHTER,
  OLIVER T. LAUER.

---

Copies of this patent may be obtained for five cents each, by addressing the "Commissioner of Patents, Washington, D. C."